United States Patent [19]

Furuya et al.

[11] 4,408,012
[45] Oct. 4, 1983

[54] POLY-2(-2'-THIAZOLYL CONTAINING AZO)-5-MALEIMIDE BENZOIC ACID CHELATE POLYMER

[75] Inventors: Setsuko Furuya, Toride; Shunji Ohnishi, Yatabemachi; Masao Kato, Sakuramura, all of Japan

[73] Assignees: Agnency of Industrial Science and Technology; Ministry of International Trade and Industry, both of Tokyo, Japan

[21] Appl. No.: 353,103

[22] Filed: Mar. 1, 1982

[30] Foreign Application Priority Data

Mar. 31, 1981 [JP] Japan ................................ 56/48831

[51] Int. Cl.³ .......................... C08F 8/28; C08F 8/30; C08F 8/34
[52] U.S. Cl. ...................................... 525/161; 525/336; 525/343; 525/346; 525/351; 525/360; 525/370; 525/371; 526/257; 526/262; 528/322
[58] Field of Search ................ 526/257, 262; 525/161

[56] References Cited

U.S. PATENT DOCUMENTS 4,233,441 11/1980 Gruber et al. ...................... 526/257
4,233,442 11/1980 Gruber et al. ...................... 526/257

*Primary Examiner*—Harold D. Anderson
*Attorney, Agent, or Firm*—Oblon, Fisher, Spivak, McClelland & Maier

[57] ABSTRACT

A novel chelate polymer having the formula:

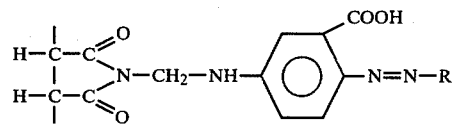

wherein R is a 2-thiazolyl or 2-benzothiazolyl group, is produced by reacting polymaleimide, formaldehyde, and m-aminobenzoic acid in the presence of a solvent, then coupling the resultant reaction product with a diazotized compound of 2-aminothiazole or 2-aminobenzothiazole. The novel polymers thus produced are useful as metal indicators or pH indicators.

2 Claims, 3 Drawing Figures

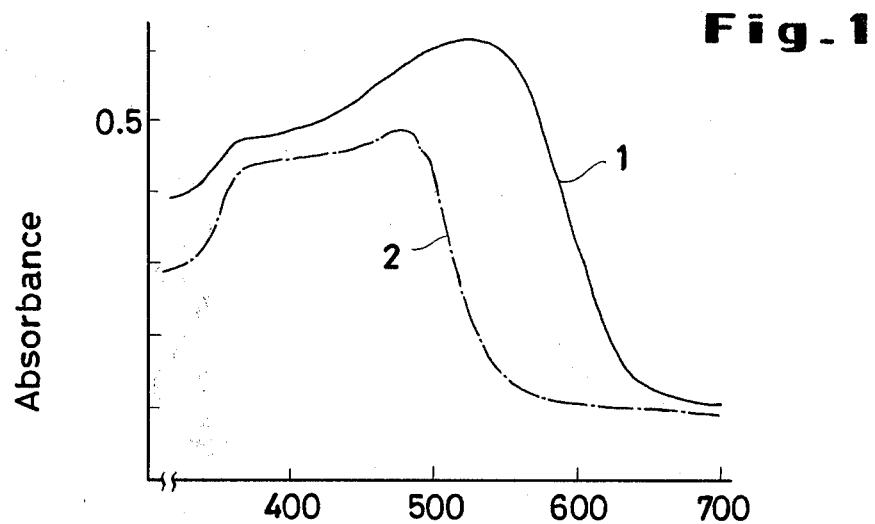
Fig._1
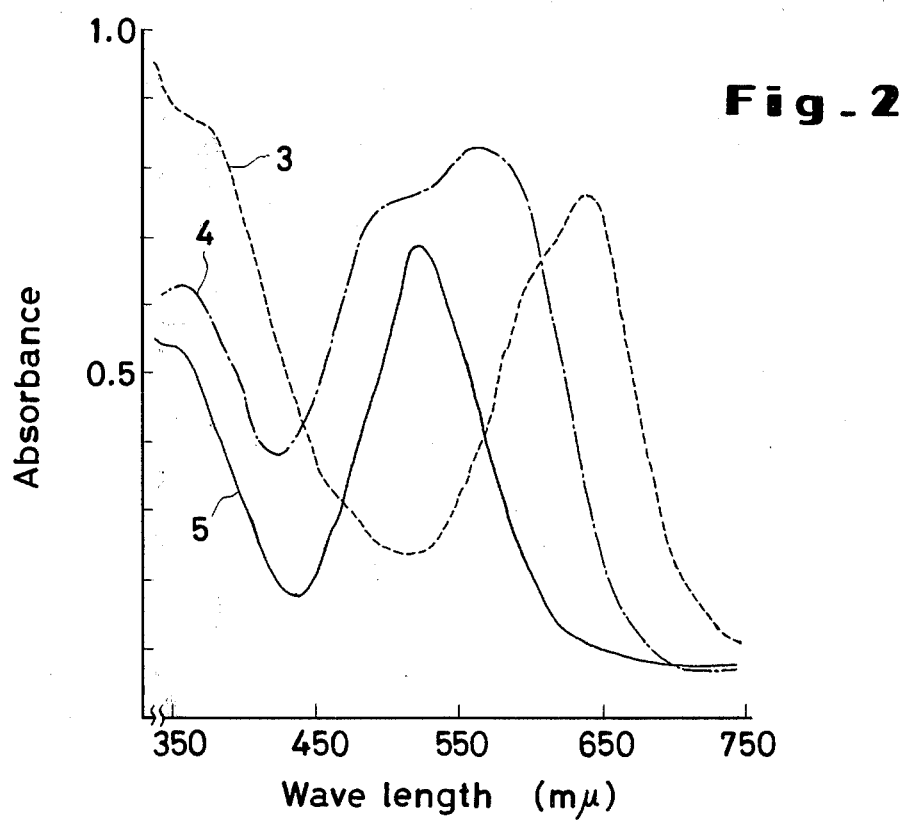
Fig._2

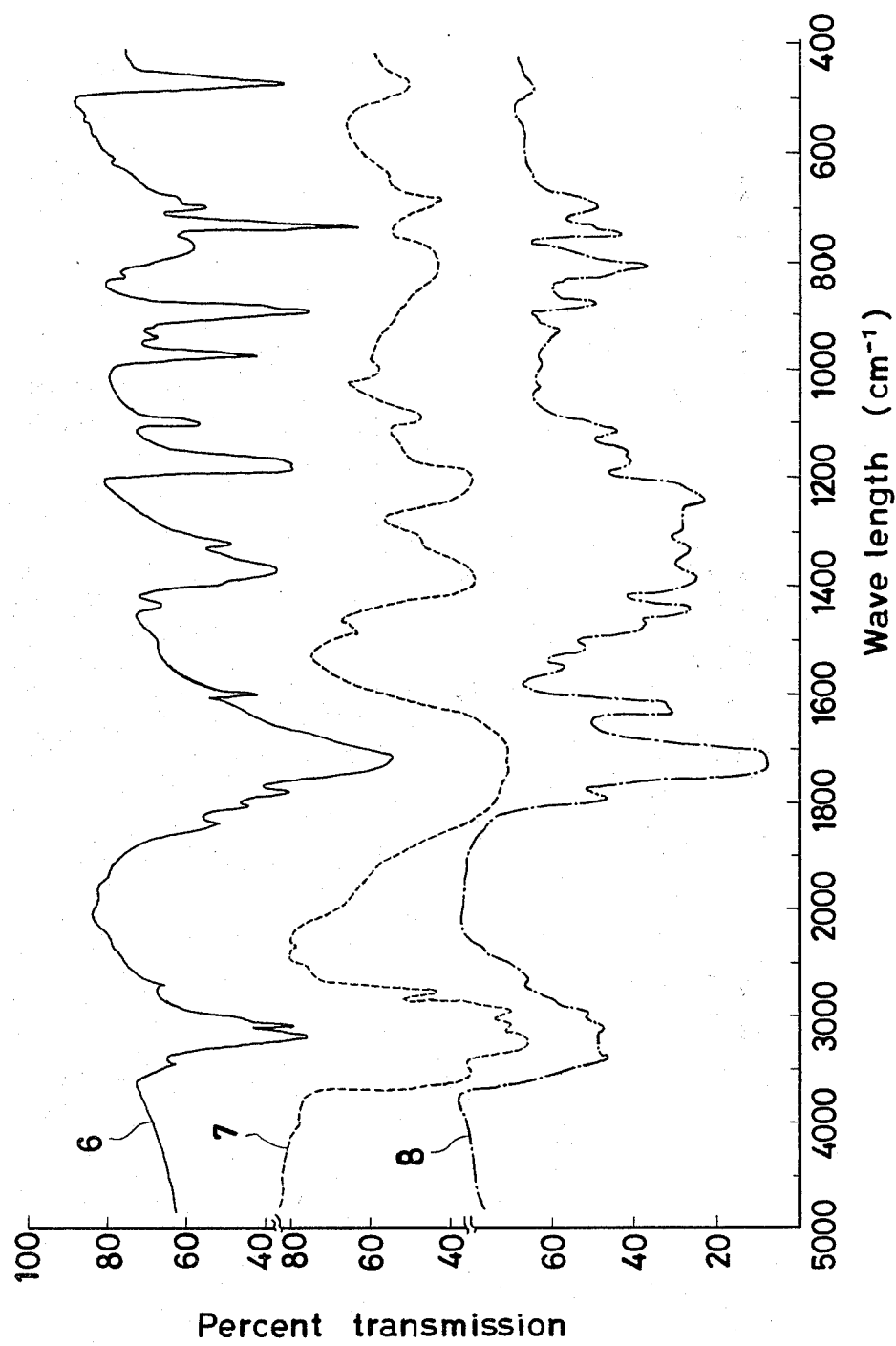

POLY-2(-2'-THIAZOLYL CONTAINING AZO)-5-MALEIMIDE BENZOIC ACID CHELATE POLYMER

BACKGROUND OF THE INVENTION

This invention relates to a novel chelate polymer, and more particularly to a polymaleimide type chelate polymer capable of changing chromaticity distinctly with pH and to a method for the manufacture of the chelate polymer. Many substances have heretofore been known to serve effectively as pH indicators and metal indicators. These substances change color at specific pH values or react with metal ions to form corresponding metal chelates and assume peculiar hues. Owing to this property, they are extensively used as in microchemicalanalysis, for example.

The inventors earlier proposed poly-2-(2'-thiazolylazo)-4-vinylphenols which they found to react catalytically with a wide variety of metals such as, for example, copper, nickel, zinc, cadmium, mercury, uranium, cobalt, iron, and palladium and produce corresponding chelates and, therefore, serve as metal indicators having pronounced color differences.

With a view to exploiting the chelating property of 2-thiazolylazo type substances, the inventors prepared chelate polymers by incorporating these substances into various polymers and studied their properties. They have consequently found that polymaleimide type chelate polymers selectively form chelates with specific metals, namely copper, nickel, cobalt and palladium, with pronounced differences in color. They have further found that the polymaleimide type chelate polymers according to this invention by themselves manifest pronounced color differences with change in pH and, therefore, are highly useful as pH indicators and that their changes in color proceed reversibly and with consistent coloration with repeated changes in pH. It has also been ascertained that the chelate polymers of the present invention produce a plurality of changes in color with pH particularly in the range of acidity and, therefore, serve advantageously as pH indicators in a wide variety of applications.

An object of this invention is to provide novel chelate polymers which selectively react with specific metals, i.e. copper, nickel, cobalt, and palladium to form chelates of specific colors and, therefore, serve advantageously as metal indicators.

Another object of this invention is to provide novel polymers which change color reversibly and with a pronounced color difference with pH and, therefore, prove to be highly useful as pH indicators.

A further object of this invention is to provide a method for the manufacture of the novel polymers mentioned above.

The other objects and characteristics of the present invention will become apparent from the further disclosure of the invention to be made hereinbelow with reference to the accompanying drawing.

SUMMARY OF THE INVENTION

To accomplish the objects described above according to the present invention, there is provided a novel polymaleimide type chelate polymer having as the repeating unit thereof a component represented by the following general formula:

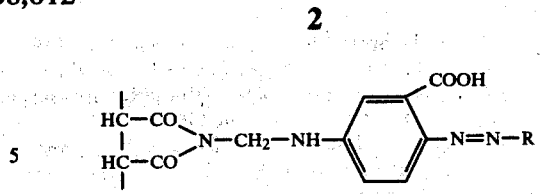

(wherein, R stands for a 2-thiazolyl group or 2-benzothiazolyl group). The novel substance of this invention described above is easily produced by causing reaction of polymaleimide, formaldehyde and m-aminobenzoic acid in the presence of a solvent and subsequently coupling the resultant reaction product with the diazotized compound of 2-aminothiazole or 2-aminobenzothiazole.

BRIEF DESCRIPTION OF THE DRAWING

FIG. 1 is a diagram showing the visible ray absorption curves of poly-2-(2'-thiazolylazo)-5-maleimide benzoic acid at pH 1 and pH 4.

FIG. 2 is a diagram showing the visible ray absorption curves of palladium chelate, copper chelate, and nickel chelate respectively of poly-2-(2'-thiazolylazo)-5-maleimide benzoic acid.

FIG. 3 is a diagram showing the infrared ray absorption spectra respectively of poly-2-(2'-thiazolylazo)-5-maleimide benzoic acid, maleimide, and polymaleimide.

DESCRIPTION OF THE PREFERRED EMBODIMENTS

The polymaleimide to be used in the manufacture of the novel substance of this invention embraces, in addition to the homopolymer of maleimide, copolymers of maleimide with monomers copolymerizable with maleimide and other polymers such as graft copolymers obtained by grafting maleimide to polypropylene, for example. Polymers containing desirably at least 3 weight percent, more desirably at least 5 weight percent, of maleimide are usable advantageously.

When the maleimide content of a polymer fails to reach 3 weight percent, the produced chelate polymer exhibits the property (coloring) as a metal indicator or pH indicator rather insufficiently. For the produced chelate polymer to be amply useful, therefore, the maleimide content of the polymer is desired to be at least 5 weight percent.

As the formaldehyde to be used in the reaction involved, formalin is the best choice. An alcohol solution of formaldehyde or paraformaldehyde which is capable of producing formaldehyde in the course of the reaction can also be conveniently used. The ratio in which the formaldehyde is advantageously used in the reaction is 1 to 1.2 moles, preferably 1 to 1.1 moles, of formaldehyde per mole of the maleimide component.

If the ratio of formaldehyde fails to reach 1 mole, non-reacted maleimide increases. If the ratio exceeds 1.2 moles, non-reacted formaldehyde increases. The preferred range of the ratio of formaldehyde, therefore, is 1.0 to 1.1 moles.

The m-aminobenzoic acid is used practically in an amount of 1 to 1.2 moles, preferably in an amount of 1 to 1.1 moles, per mole of the maleimide component.

For the purpose of this invention, the aminobenzoic acid must be m-aminobenzoic acid. Only when this requirement is satisfied, does the produced chelate polymer selectively react with copper, nickel, cobalt, and palladium alone to produce corresponding metal chelates, presumably because the diazo group is attached to the p position of the amino group and, consequently, the carboxyl group of the benzoic acid is attached to the o position of the azo group during the coupling with the diazotized compound of 2-aminothiazole.

The reaction of polymaleimide, formaldehyde and m-aminobenzoic acid can be accomplished by simultaneously adding the three compounds to one another in the presence of a solvent such as, for example, a solvent composed of ethyl alcohol and dimethyl sulfoxide (2:8) or a solvent composed of ethyl alcohol and tetrahydrofuran (2:8). Otherwise, this reaction may be effected by first causing formaldehyde to react with m-aminobenzoic acid and subsequently allowing the resultant reaction product to react upon polymaleimide. Alternatively, the reaction may be carried out by dissolving polymaleimide in a suitable hydrating solvent and causing the resultant solution to be reacted upon first by formaldehyde and then by m-aminobenzoic acid. The solvent to be used in this reaction is desired to be capable of dissolving all of the three compounds involved and further capable of substantially dissolving the reaction product. It is imperative that the solvent should enable the reaction to proceed homogeneously. If this requirement is satisfied, the solvent can tolerate precipitation of the final reaction product. When the methylolation of m-aminobenzoic acid is separately carried out, it is advantageous to use formalin because the reaction product is soluble in water. It is desirable to have polymaleimide dissolved before it is added to the reaction system. If a hydrating solvent is selected for use in this solution of polymaleimide, the methylolation can be effected by using formalin. As typical examples of the solvent usable for the solution of polymaleimide, there can be cited dimethyl sulfoxide (DMSO) and tetrahydrofuran (THF). Any of the other solvents may be used in this case on condition that the solvent offers no obstacle to the subsequent reaction and treatment. Generally, the solvent in this reaction is advantageously used as mixed with a small amount of water or with another hydrating solvent such as, for example, methanol, ethanol, or acetone. For example, a mixed solvent of DMSO containing 20 percent of ethanol can be effectively used. Regardless of whether or not the three compounds are used all at once in the reaction, the reaction gradually proceeds at room temperature. The reaction can be carried out at temperatures above 40° C., preferably in the range of 70° to 120° C.

The 2-aminothiazoles and 2-aminobenzothiazoles which are to be coupled with the reaction product of polymaleimide, formaldehyde and m-aminobenzoic acid include, besides 2-aminothiazole and 2-aminobenzothiazole, the nuclear-substitution products such as, for example, 2-amino-4-methylthiazole, 2-amino-5-nitrothiazole, 2-amino-6-methoxybenzothiazole, and 2-amino-6-ethoxybenzothiazole. Further, these thiazoles and benzothiazoles which have 2-position amino groups available for diazotization are likewise useful. The products obtained by diazotizing these substances and then coupling the resultant diazotized compounds with the reaction product of the aforementioned three compounds are characterized by producing marked changes in color during the formation of chelates.

The diazotization of 2-aminothiazoles can be carried out by an ordinary method. For example, a diazotized solution of a given thiazole may be obtained by dissolving the thiazole in about 6 normal hydrochloric acid, ice cooling the resultant solution, and adding gradually thereto, generally under ice cooling, sodium nitrite dissolved in advance in a small amount of water. This diazotized solution is used for the coupling reaction.

For use in the coupling reaction, the three-component polymerized reaction product, namely the aforementioned reaction product of the three compounds, is precipitated and separated, washed thoroughly, purified, and dried and then dissolved as in a mixed solvent of tetrahydrofuran and water, for example. The coupling reaction is accomplished by cooling the solution just mentioned and pouring therein the aforementioned diazotized solution of 2-aminothiazole or 2-aminobenzothiazole in such an amount that the three-component polymerized reaction product and the diazotized product will undergo the coupling reaction in substantially equal moles. The reactants of the coupling reaction, thus, are desired to be in substantially equal moles. To be more specific, the molar ratio of the reactants is desired to be such that the amount of the diazotized compound is in the range of 1.0 to 1.2 moles per mole of the three-component polymerized reaction product.

The product of the coupling reaction generally precipitates and settles to the bottom of the reaction system. By separating this precipitate through filtration and purifying and drying the wet precipitate, the chelate polymer aimed at is obtained. This purification can be accomplished by a conventional treatment. For example, it can be effected by dissolving the coupling polymer separated by filtration as in dioxane and adding the resultant solution to a mixed solvent of water and methanol (1:1 by volume) thereby precipitating the polymer in the solvent.

When the chelate polymer of this invention is manufactured by the method of this invention, the yield of the chelate polymer is 60–80 percent.

Concrete examples of the novel chelate polymer obtained by the present invention are shown below.

(1) Poly-2-(2'-thiazolylazo)-5-maleimide-methyl aminobenzoic acid (PTAMMABC)
(2) Poly-2-(2-benzothiazolylazo)-5-maleimide-methyl aminobenzoic acid (PBTAMMABC)
(3) Copolymer of PTAMMABC and styrene
(4) Copolymer of PBTAMMABC and methylmethacrylate Now, the properties which these chelate polymers exhibit when used as indicators will be described. PTAMMABC turns to orange yellow around pH 1.8, to red around pH 3, and to yellow above pH 4. PBTAMMABC turns to bluish purple around pH 1.8, to orange yellow around pH 3, and to yellowish brown above pH 4. Thus, they can be advantageously used as pH indicators particularly on the acidic side. Other substituted derivatives of PTAMMABC and PBTAMMABC show a plurality of peculiar colorations to the relevant chelate polymers in accordance with changes in pH. Thus, they can all be used effectively as pH indicators. Their changes in color occur distinctly and faithfully to changes in pH even when the pH is changed from the acid side to the alkali side or in the opposite direction or when this cyclic pH change is repeated. The colors they assume, therefore, conform faithfully to changes in pH and accordingly consistent coloration is obtained. Also as selective metal chelating agents, the chelate polymers of this invention form chelates only with copper, nickel, cobalt, and palladium. The chelates thus formed have colors with pronounced color difference with respect to one another. The chelate polymers, accordingly, serve as ideal indicators for these metals.

Now, the characteristics and the outstanding effects which the chelate polymers of this invention manifest as indicators will be described hereinbelow with reference to the accompanying drawing.

FIG. 1 is a diagram illustrating visible ray absorption curves of PTAMMABC of this invention. In the diagram, the vertical axis is the scale of absorbance and the horizontal axis the scale of wavelength of the visible ray. The curve 1 represents the data of absorption obtained of PTAMMABC at pH 1 and the curve 2 those at pH 4. It is noted from the visible ray absorption curves given in this diagram that PTAMMABC shows a shoulder of absorption at 370 mμ and a maximum absorption at 520 mμ and turns to orange yellow at pH 1 and shows a shoulder of absorption at 370 mμ and a maximum absorption near 470 mμ and turns to red at pH 4.

FIG. 2 is a diagram illustrating visible ray absorption curves of the palladium, copper, and nickel chelates of PTAMMABC. In the diagram, the vertical axis is the scale of absorbance and the horizontal axis the scale of wavelength of the visible ray. The curve 3 represents the data obtained of the palladium chelate of PTAMMABC, the curve 4 those obtained of the copper chelate of PTAMMABC, and the curve 5 those obtained of the nickel chelate of PTAMMABC respectively. It is noted from the visible absorption curves given in this diagram that the palladium chelate shows a maximum absorption near 650 mμ and turns to bluish green, the copper chelate assumes a maximum absorption near 575 mμ and turns to purple, and the nickel chelate shows a maximum absorption near 535 mμ and turns to orange yellow, and that these changes in color are conspicuous. The following table shows the colors which are assumed by varying metal chelates of the polymers of the present invention.

TABLE 1

| Metal component of chelate | PTAMMABC | PBTAMMABC |
| --- | --- | --- |
| $Co^{2+}$ | Orange yellow | Purple |
| $Ni^{2+}$ | Orange yellow | Purple |
| $Cu^{2+}$ | Orange yellow | Blue |
| $Pd^{2+}$ | Orange yellow | Green |

FIG. 3 is a diagram illustrating an infrared absorption spectrum (curve 8) of the novel PTAMMABC of the present invention obtained by the KBr tablet method. In the diagram, infrared absorption spectra similarly obtained of maleimide (curve 6) and polymaleimide (curve 7) are shown for the purpose of comparison. In the curve 8, an absorption of the C=O of imide characteristically appears at 1690 cm$^{-1}$ and, further, absorptions at 1600 cm$^{-1}$ and 1520 cm$^{-1}$ indicating the presence of benzene, absorptions at 1615, 1070, 820, and 760 cm$^{-1}$ indicating the 1, 2, and 4 substitutions of benzene, and an absorption peak of sulfur at 700 cm$^{-1}$ all appear conspicuously. In the curve 6, a similar absorption of the C=O of imide appears at 1690 cm$^{-1}$. And in the curve 7, the absorptions of C=O at 760 cm$^{-1}$ and 830 cm$^{-1}$ are absent because of the polymerization of maleimide.

Now, this invention will be described more specifically below with reference to working examples.

EXAMPLE 1

In 70 ml of dimethyl sulfoxide (DMSO) containing 20 percent of ethanol, 1.94 g (0.02 mole) of polymaleimide was dissolved. The resultant solution, with 2 ml of 37 percent formalin solution added thereto, was thermally refluxed at temperatures of 70° to 75° C. To the substance obtained by the thermal reflux was added a solution obtained by dissolving 2.74 g (0.02 mole) of m-aminobenzoic acid in 10 ml of a DMSO solution containing 20 percent of ethanol. This mixed solution was refluxed for two hours. Then, the reaction solution was cooled, and the cooled reaction solution was added to a mixed solution of water and methanol to precipitate insoluble components. The final precipitate was separated by filtration and dissolved in a DMSO solution. The resultant solution was purified by repeated addition of water and methanol in the manner just mentioned, and finally dried. A 2.46-g portion (0.01 mole) of poly-m-maleimidemethyl aminobenzoic acid thus obtained was dissolved in a mixed solution of water and tetrahydrofuran and cooled with water. Separately, 1 g (0.01 mole) of 2-aminothiazole was dissolved in 20 ml of 6 normal hydrochloric acid and cooled. A solution obtained by dissolving 0.74 g of sodium nitrite in a small amount of water was gradually added, while under ice cooling, to the 2-aminothiazole solution to effect diazotization. The resultant diazotized solution was added to the cooled poly-m-maleimidemethyl aminobenzoic acid solution, with the molar ratio of poly-m-maleimidemethyl aminobenzoic acid to the diazotized compound at 1:1, to effect diazo coupling. The precipitate which consequently occurred was separated by filtration and dissolved in dioxane. The resultant solution was poured in a mixed solution of water and methanol. The precipitate was again purified and dried to afford 3.37 g of PTAMMABC (m.p. 280° C.).

EXAMPLE 2

A 2.46-g portion (0.01 mole) of poly-m-maleimidemethyl aminobenzoic acid produced by following the procedure of Example 1 was dissolved in a mixed solution of water and tetrahydrofuran. The resultant solution was kept cooled with ice. Separately, 1.5 g (0.01 mole) of 2-aminobenzothiazole was dissolved in 20 ml of 6 normal hydrochloric acid and the produced solution was cooled. A solution obtained by dissolving 0.74 g of sodium nitrite in a small amount of water was gradually added, under ice cooling, to the 2-aminobenzothiazole solution to effect diazotization. The diazotized solution was added to the cooled poly-m-maleimidemethyl aminobenzoic acid solution, with the molar ratio of poly-m-maleimidemethyl aminobenzoic acid to the diazotized compound at 1:1, to effect diazo coupling. The precipitate which consequently occurred was separated by filtration and dissolved in dioxane. The solution was poured into a mixed solution of water and methanol to effect precipitation of the produced polymer. The precipitate was purified and dried to afford 3.67 g of PBTAMMABC (m.p. 292° C.).

What is claimed is:

1. A polymaleimide chelate polymer comprising a repeating unit component having the formula:

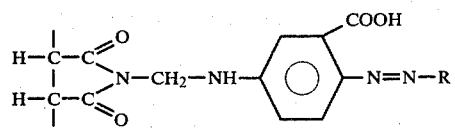

wherein R is selected from the group consisting of 2-thiazolyl and 2-benzothiazolyl groups.

2. The polymaleimide chelate polymer according to claim 1, wherein the repeating unit component comprises at least 3 percent by weight of said polymer.

* * * * *